June 30, 1942.  M. DACH  2,288,438
BRAKE DRUM
Filed Aug. 8, 1940
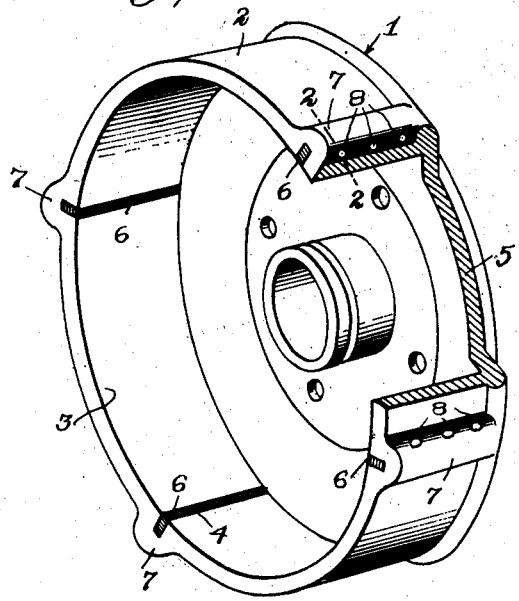
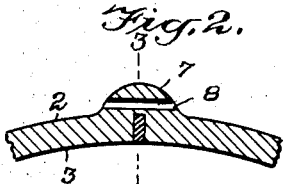
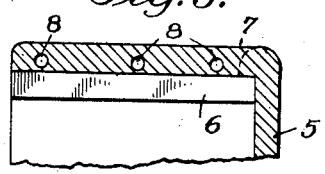
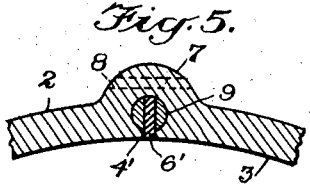
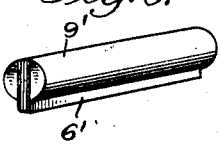
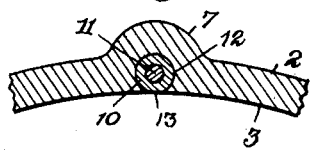
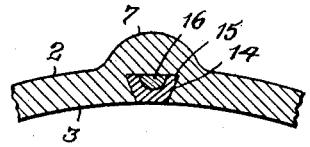
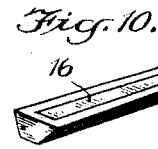
WITNESSES
INVENTOR
Max Dach
BY
Munn, Anderson & Liddy
ATTORNEYS Patented June 30, 1942

2,288,438

UNITED STATES PATENT OFFICE 2,288,438

BRAKE DRUM

Max Dach, Flushing, N. Y.

Application August 8, 1940, Serial No. 351,848

7 Claims. (Cl. 188—218)

This invention relates to brake drums for trucks, passenger cars and other vehicles, and has for an object to provide a construction which utilizes the usual brake shoe formation and the usual functioning drum while presenting a structure in which vibration or resonance is eliminated or reduced to a minimum.

Another object of the invention is to provide a brake drum of a construction wherein the functioning surface will not glaze and thereby produce undesirable sounds either in wet or dry weather.

A further and more specific object of the invention is to provide a brake drum which has the general appearance of a standard brake drum but which is provided with grooves or slots at spaced intervals which may be left open or filled with a material different from the drum itself, whereby a quiet drum is presented.

In the accompanying drawing—

Fig. 1 is a perspective view of a brake drum disclosing an embodiment of the invention, a certain portion being broken away for better illustrating the construction;

Fig. 2 is a fragmentary sectional view through Fig. 1 approximately on the line 2—2;

Fig. 3 is a sectional view through Fig. 2 approximately on the line 3—3;

Fig. 4 is a perspective view of the metal strip or plate shown in Figs. 2 and 3;

Fig. 5 is a view similar to Fig. 2 but showing a modified form of the invention;

Fig. 6 is a perspective view of the filling structure shown in Fig. 5;

Fig. 7 is a view similar to Fig. 5 but showing a further modified form of the invention;

Fig. 8 is a perspective view of the filling member shown in Fig. 7;

Fig. 9 is a sectional view similar to Fig. 7 but showing an additional modified form of the invention;

Fig. 10 is a perspective view of the filling member shown in Fig. 9;

Fig. 11 is a view similar to Fig. 5 with the filling structure omitted;

Fig. 12 is a view similar to Fig. 2 but showing the thickened portion or lug eliminated.

Referring to the accompanying drawing by numerals, 1 indicates the brake drum as a whole, which may be constructed in any desired way provided it is formed with a drum flange 2 having a braking surface 3. In brake drums for trucks, passenger automobiles, buses and the like, a flange similar to flange 2 is provided and then brake shoes having brake linings are arranged therein. These linings are pressed against the surface 3 to produce friction to slow down or stop the vehicle. The construction just described is old and well known and is in common use on the market today. However, the surface 3 sometimes becomes glazed and very smooth and also the brake lining may become smooth or glazed. When this occurs it requires extra pressure or power to secure the desired friction to produce the necessary braking action and usually produces considerable sound which, in fact quite often is a howl or screech. This occurs sometimes in dry weather and quite often in wet weather. Where the flange 2 is continuous and smooth on the inside, which is necessary, a continuous wearing of the parts will sometimes cause the surface 3 to take on a glaze or smooth appearance and will produce undesirable noises when stopping the vehicle rather suddenly. Many reasons have been given heretofore for this undesirable noise but usually it includes the vibration or resonance of the flange 2.

In the present invention means have been provided for reducing to a minimum or completely eliminating this vibration or resonance so that the drum under all conditions will remain quiet and will efficiently perform its desired braking action. The construction is also such that glazing either the brake lining or the surface 3 will be reduced to a minimum or completely eliminated. Specifically one embodiment of the invention is shown in Fig. 1, wherein there are provided four grooves or slots 4 which do not extend entirely through the flange 2. These grooves preferably extend laterally entirely across the surface 3. As shown in Fig. 3, the grooves stop at the bottom or back wall 5. As above mentioned, four of these grooves are shown in Fig. 1, but a greater or even a less number could be used without departing from the invention. One advantage of this arrangement of grooves is to cut the inner surface into a plurality of independent sections wherein vibration or resonance is eliminated or reduced to a minimum and, consequently, will not be produced when the drum is in use. The grooves 4 could be left empty and very desirable results secured especially where there are six or eight grooves. Where a less number of grooves are provided preferably they are filled tightly with a filling strip 6 of metal.

The drum 1 with flange 2 is made of a ferrous metal while the filling strip 6 is preferably made of a non-ferrous metal, namely, brass or some other metal having substantially the characteristics of brass, including the wear and nonresonance of brass, when pressed tightly into the grooves. Brass when free may have a great resonance but when pressed tightly into a groove, which is very narrow as shown in Fig. 1, there will be no measurable resonance produced but, on the contrary, a proper supporting surface for the brake shoe and a dividing up of the braking surface 3. The grooves 4 could be arranged as shown in Fig. 12, namely, extending a short distance radially inwardly from the inner surface 3, or they could be made much deeper as shown in Figs. 1 to 3 inclusive. When the grooves are made deeper there are provided lugs or thickened portions 7 on the exterior part of the flange 2. By the use of the thickened portions 7 the grooves 4 may be made quite deep and may be made to extend to a point adjacent the outer surface of the drum between said thickened portions. It will be understood that the thickened portion or lug is integral with the flange 2 and may be made solid, as illustrated in Figs. 7 and 11, or may be provided with a plurality of passageways or apertures 8, as shown in Figs. 1, 2 and 5. The passageways are adapted to allow air to pass and thereby produce a certain cooling action as the drum rotates the thickened portion 7. The lugs are arranged opposite the grooves in order to strengthen the drum where it would otherwise be weakened by the formation of the slots or grooves 4. The brass filling member 6 is of a size to require considerable effort to force the same into the groove 4 so that it is somewhat compressed and thereby held in position by friction. After the strip 6 has been placed in position, the surface 3 is machined to the desired diameter and the drum is completed.

In large drums and also in smaller drums, sometimes it is desirable to have a greater damping effect produced by the filling structure and when this is the case there is provided a hole 9 into which merges a groove 4' as shown in Fig. 5 and then lead 9' is forced into position on each side thereof. This lead may be poured in a molten state or may be pressed into place. Lead is a close grained metal and when it tightly contacts the surface of the flange 2 in the hole 9, it will absorb an appreciable amount of vibration of the flange. The strip 6' of coarser grained material will likewise absorb a certain amount of vibration. This vibration or resonance of the flange is reduced by the formation of the grooves and is further reduced or eliminated by providing a vibration-absorbing metal in the grooves or in the hole 9, as the case may be. Under some circumstances, the hole 9 and the groove 4' are left unfilled as shown in Fig. 11. For smaller drums this produces very desirable results. As another form of vibration-absorbing structure, a tubular member 10 may be used. This may be brass or similar material and may be filled with lead 11 or other vibration-absorbing material. When this structure is used, as shown in Figs. 7 and 8, a hole 12 is bored in the flange 2 and the hole is so positioned that the member 10, which is ordinarily tubular in cross section, is forced into the hole 12 and a small portion of the member 10 will project beyond the surface 3. When the surface 3 is machined the desired size and smoothness the small portion or section 13 will be machined off so that the entire inner surface of the flange 2 will be continuous.

As a further modified form of the same inventive concept of providing grooves and a filler therefor which will absorb the vibration, an arrangement using a dovetail structure may be used as shown in Fig. 9. In this embodiment of the invention a dovetail groove is provided, which groove is filled tightly with a filler 15 which is properly shaped to fill the groove. The filler 15 may be brass or some other comparatively soft metal and is preferably trough-shaped so that a supply of lead or other soft metal 16 may be positioned therein to additionally absorb vibration. It will be understood that not only in this form of the invention but in all forms thereof the fillers very tightly fit in the grooves or holes in the flange. It will also be noted that all the fillings are preferably of some kind of metal which is different from the metal of the drum. Preferably the drum is made of ferrous metal, while the fillings are made of brass or similar comparatively soft metal which may be used alone as shown in Fig. 1, or in connection with another metal which is of the same kind of softness or slightly more soft or slightly harder. In all instances, the filling absorbs a certain amount of vibration and also the cuts or grooves 4 divide the inner surface 3 of the drum into comparatively short sections so that vibrations will not be produced to any considerable extent. This results in an efficient brake drum and one that is quiet under all circumstances.

Other methods may be used to incorporate means in the drum or fasten means to it, to scrape the brake lining in order to cause it to wear even, remove the graze, and by doing so, keep the temperature of the drum at a minimum. It will be appreciated that the grooves and filler members cooperate to remove the glaze which normally forms on the drum shoe brake lining and which in the usual case is transmitted to the drum. Naturally, this glaze presents a slippery surface which takes more power to operate. The insert or filler material being of a slightly softer texture than the flange of the drum causes the edge of the groove to act as a razor to remove the glaze from the drum shoe. The insert further acts to machine the drum shoe and to produce a better fit, thus providing a complete frictional surface which causes the drum to run cooler and to operate with less energy and heat. Since the drum shoe is normally mounted on an anchor, it is impossible to secure an absolute fit in manufacture, but the wear of the drum and shoe against the groove will produce a perfect fit.

I claim:

1. A ferrous metal brake drum having an annular inner braking surface formed with a plurality of spaced grooves, said grooves at their radially outer ends being enlarged, a rectangular strip of metal having the wearing and sound damping effect of brass positioned in each of said grooves and extending from said braking surface to the bottom of the groove and having a supply of lead filling that part of said enlarged grooves not occupied by said strip of metal and engaging the sides thereof.

2. A ferrous metal brake drum formed exteriorly with a plurality of spaced radially outwardly extending lugs and interiorly with a braking surface, said braking surface in line with each of said lugs having a radially extended groove and a metal filling for each of said grooves formed of metal having lower resonant properties than the metal of said drum.

3. A drum as set forth in claim 2, characterized by forming the radially outer part of the respective grooves larger than the radially inner part and forming the filling to conform to the shape of the grooves, said filling being formed of two different metals, both being different from the metal of the drum.

4. A metal brake drum having an annular inner braking surface and an exterior surface, said exterior surface having at spaced intervals thickened portions, a plurality of substantially circumferentially extending apertures in each of said thickened portions, said apertures being positioned radially outwardly beyond the outer surface of the drum whereby, when the drum rotates, air will pass through said apertures and said braking surface having a plurality of grooves extending radially opposite each of said thickened portions.

5. The combination in a brake drum of an annular flange having a cylindrical braking surface for engagement by a frictional brake element, said flange having a plurality of annularly spaced slots in the braking surface extending from one edge of said flange transversely thereof and partially through the thickness of the flange to form the periphery of the flange into a plurality of sagment-like portions, a filler of low resonant material filling said slots to prevent the propagation of sound by said flange, and means for mounting said flange on a rotating element.

6. The combination in a brake drum of an annular flange having a cylindrical braking surface for engagement by a frictional brake element, said flange having a plurality of annularly spaced bores extending from one edge of said flange intermediate the sides thereof transversely of said flange, and slots of a width less than the diameter of said bores extending from said bores through said braking surface to prevent the propagation of sound by said flange, said flange having reinforcing bulges on its outer surface parallel to said bores to provide a thickness of metal on said bores substantially equal to the thickness of said flange therebetween.

7. A metal brake drum having an annular inner braking surface and at spaced intervals on the exterior surface thickened portions, said braking surface having grooves extending radially outwardly opposite each of said thickened portions and said thickened portions having a plurality of substantially circumferentially extending apertures in each of said thickened portions, said apertures being positioned radially outwardly beyond the outer surface of the drum, whereby when the drum rotates air will pass through the apertures for producing a cooling effect.

MAX DACH.